US 6,626,160 B2

(12) United States Patent
Liedtke et al.

(10) Patent No.: US 6,626,160 B2
(45) Date of Patent: Sep. 30, 2003

(54) ENGINE WITH AIR-ASSISTED FUEL INJECTION AND ENGINE INTEGRATED AIR FEED

(75) Inventors: Jennifer L. Liedtke, Rochester, MI (US); Mark Alan Mitchell, Dryden, MI (US)

(73) Assignee: General Motors Corporation, Detroit, MI (US)

( * ) Notice: Subject to any disclaimer, the term of this patent is extended or adjusted under 35 U.S.C. 154(b) by 92 days.

(21) Appl. No.: 09/870,557

(22) Filed: Jun. 1, 2001

(65) Prior Publication Data

US 2002/0179067 A1 Dec. 5, 2002

(51) Int. Cl.[7] .............................................. F02M 23/00
(52) U.S. Cl. ....................... 123/531; 123/527
(58) Field of Search ................... 123/531, 533, 123/41.31, 41.72, 41.82 R, 527

(56) References Cited

U.S. PATENT DOCUMENTS

| 4,934,329 | A | * | 6/1990 | Lear et al. .................. 123/531 |
| 5,036,824 | A | * | 8/1991 | Albertson et al. ........... 123/531 |
| 5,146,904 | A | * | 9/1992 | Olson et al. ................ 123/533 |
| 5,622,155 | A | * | 4/1997 | Ellwood et al. ............. 123/531 |
| 6,279,516 | B1 | * | 8/2001 | Haugen et al. ........ 123/41.82 R |

FOREIGN PATENT DOCUMENTS

WO    WO-9958847    * 11/1999

* cited by examiner

Primary Examiner—Mahmoud Gimie
(74) Attorney, Agent, or Firm—Leslie C. Hodges

(57) ABSTRACT

An engine includes air-assisted fuel injection including fuel injectors supplying fuel through cylinder head-mounted air injectors. An internal air passage in the cylinder head connects with internal air pockets receiving the injectors and supplying them with air. Seals on the air injectors prevent air leakage from the air pockets. The air temperature in the head is affected by an adjacent coolant passage.

15 Claims, 2 Drawing Sheets

ENGINE WITH AIR-ASSISTED FUEL INJECTION AND ENGINE INTEGRATED AIR FEED

TECHNICAL FIELD

This invention relates to internal combustion engines and more particularly to an engine with air-assisted direct cylinder fuel injection.

BACKGROUND OF THE INVENTION

It is known in the art relating to spark-ignited internal combustion engines to provide for the direct injection of fuel into the combustion chambers, normally through the cylinder head of the engine. Air-assisted direct injection fuel systems have been developed for such engines which utilize a combination of solenoid-actuated fuel injectors which inject pressurized fuel into associated air injectors. The air injectors mix pressurized air with the fuel and inject the mixture of air and fuel directly into the engine combustion chambers. The air injectors are mounted in the engine cylinder head and the fuel injectors are mounted at the outer ends of the air injectors. Separate air and fuel rails are provided which respectively supply air to the air injectors and fuel to the fuel injectors. The arrangement is easily modified for application to various engine configurations but involves a large number of components to be mounted along the top of the cylinder head and having external fittings and connections.

SUMMARY OF THE INVENTION

The present invention provides an improved arrangement for an air-assisted fuel injection system mounted on an engine. The engine includes an internal air passage acting as an air manifold and preferably disposed in an engine cylinder head or other component defining a portion of an associated combustion chamber. Modified air injectors are provided which fit into stepped boars in the cylinder head and include seals at opposite ends of a central portion of the bore which defines annular air pockets. The air pockets are intersected by the internal air passage or manifold running longitudinally along the length of the cylinder head. The air passage or manifold is provided with pressurized air from an external source which is fed to the air pockets and enters each of the air injectors.

These and other features and advantages of the invention will be more fully understood from the following description of certain specific embodiments of the invention taken together with the accompanying drawings.

DESCRIPTION OF THE PREFERRED EMBODIMENT

Figure 1:
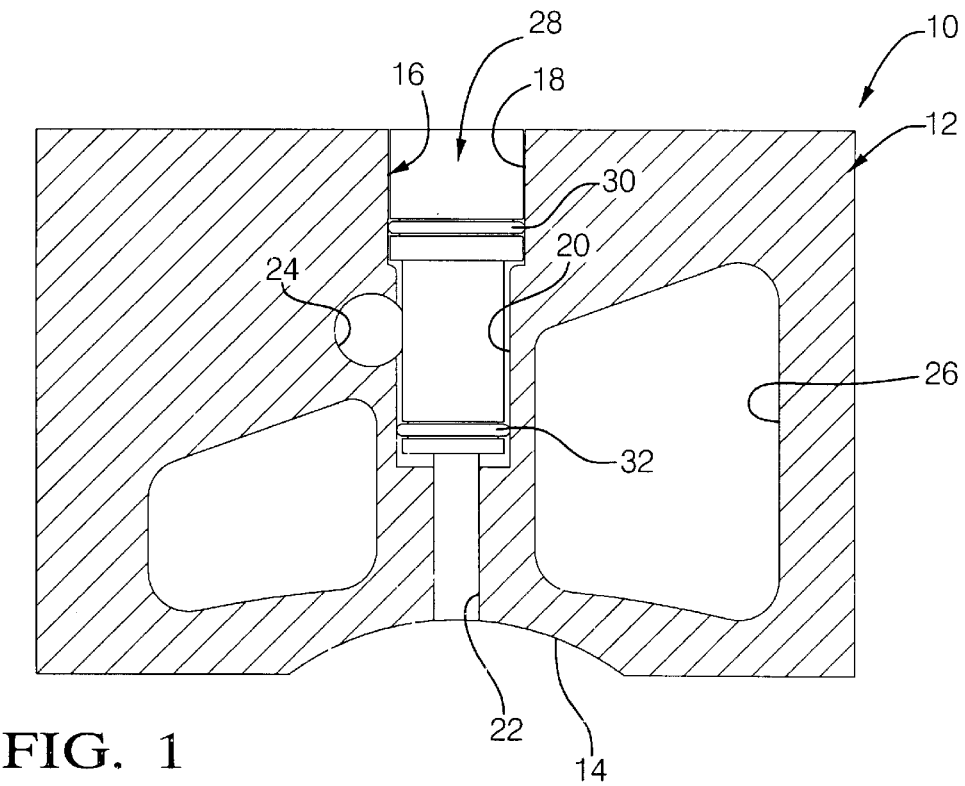
FIG. 1 is a transverse cross-sectional view of an engine cylinder head assembly showing mounting of the air injector and internal air supply in the engine cylinder head.

Referring first to FIG. 1 of the drawings in detail, numeral 10 generally indicates an engine cylinder head assembly for use in an engine according to the invention. Assembly 10 includes a cylinder head 12 having a lower wall with a recess 14 defining a portion of a combustion chamber of an associated engine. The cylinder head includes an injector mounting opening 16. Opening 16 is formed as a stepped bore including an enlarged inlet portion 18, a smaller central portion 20 and a still smaller outlet portion 22, opening to the combustion chamber recess 14. The central portion 20 of the opening 16 defines an air pocket, one side of which is intersected by an air passage 24 that extends longitudinally through the cylinder head, connecting with other combustion chambers not shown defined by the cylinder head. The cylinder head also contains a coolant passage 26 extending adjacent to the air pockets in the central portions 20 of the openings 16.

An air injector 28 is mounted in the injector mounting opening 16 and is stepped with three diameters corresponding to the mounting opening diameters. An upper seal 30 is mounted in an upper portion of the air injector engaging the inlet portion 18 of opening 16. A lower seal 32 is mounted near the lower end of the central portion 20 of the injector 28, engaging the wall of the central portion 20 or air pocket of the mounting opening 16. The seals 30, 32 close off the upper and lower ends of the air pocket 20 to prevent the escape of air supplied to the air pocket through the intersecting air passage 24.

In operation, pressurized air is continuously fed to the air injector from the passage 24 and pocket 20. The fuel injector when actuated delivers fuel to the air injector to mix with the air. The air injector is then actuated to deliver the pressurized air-fuel mixture to the combustion chamber of the associated engine where it is ignited and burned to produce power.

The arrangement so far described reduces the external plumbing and fittings commonly utilized with air-assisted fuel injection systems by providing the internal air passage, intersecting air pockets in associated injector mounting openings which directly feed air to the air injectors mounted in the cylinder head. Placement of the air pockets 20 and passage 24 adjacent to coolant passages 26 in the cylinder head also has the advantage of helping to maintain the pressurized air at a controlled temperature. This reduces the possibility of water vapor condensing out of the air in liquid form and adversely affecting fuel mixture preparation. It also prevents freezing or icing, which can affect functioning of the injectors.

Figure 2:
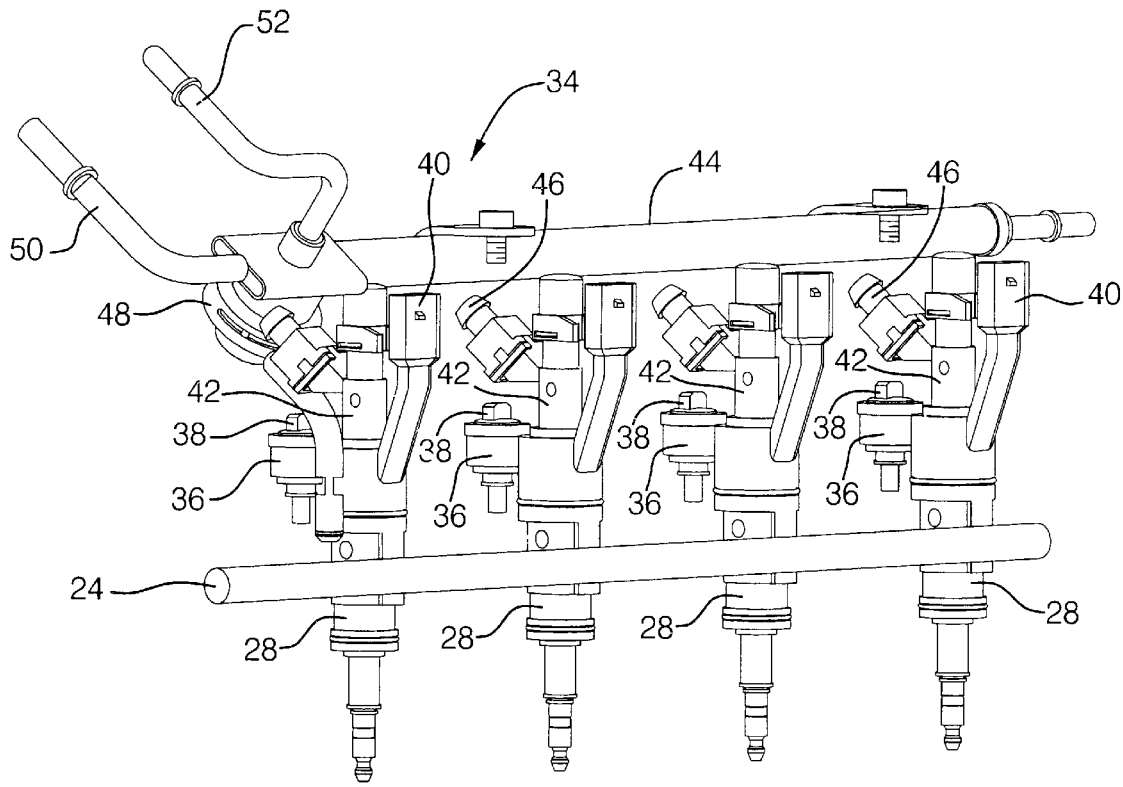
FIG. 2 is a pictorial view of a fuel injection assembly for installation in an engine with the location of the cylinder head internal air passage indicated but without the cylinder head structure being shown.

Referring now to FIG. 2 of the drawings, a fuel system assembly 34 is shown as mounted within a cylinder head 12, not shown. Assembly 34 includes four air injectors 28 as mounted in a cylinder head 12, not shown, and connected to the air passage 24 within the cylinder head through which pressurized air is supplied to the cylinder head air pockets 20, not shown. The air injectors extend to lower ends which are connected with associated combustion chambers 14, not shown, of the associated cylinder head. The air injectors further include attachment flanges 36, secured by fasteners 38 to the cylinder head, and electrical connectors 40 for connection with a controller for controlling the opening and closing action of the air injectors. Each of the air injectors 28 is fed by a fuel injector 42 which mounts on the upper end of the air injector. The fuel injectors 42 are connected with a fuel rail 44, extending above the cylinder head and connecting with upper ends of the individual fuel injectors. Electrical connectors 46 are provided, one for each of the fuel injectors, for providing external actuation of the fuel injectors as required. The fuel rail includes a fuel pressure regulator 48 at one end with associated fuel supply and return lines 50, 52.

Figure 3:
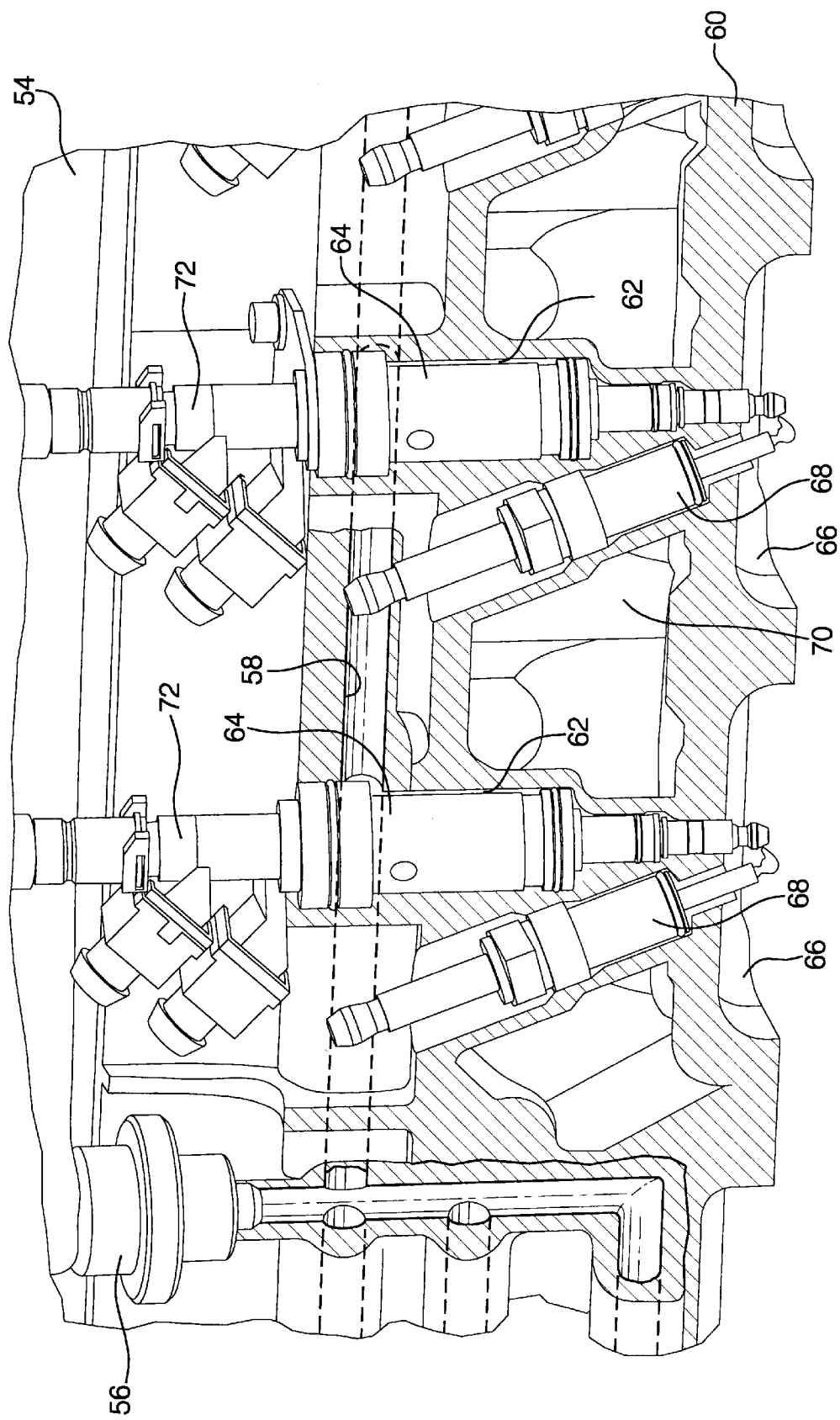
FIG. 3 is a pictorial cross-sectional view of an alternative cylinder head assembly including air-assisted injection components in accordance with the invention.

FIG. 3 shows a portion of a modified engine cylinder head assembly with a fuel system including features of the present invention. Cylinder head assembly 54 includes a fuel pressure regulator 56 actuated by air pressure supplied to an internal passage 58 that extends longitudinally within the cylinder head 60 to connect with air pockets 62 in which air injectors 64 are mounted. Injectors 64 extend downward into associated combustion chambers 66 defined in part below the cylinder head. Electric igniters 68 are mounted in the cylinder head and have lower tips adjacent the outlet ends of the air injectors for igniting the air-fuel mixture injected into the combustion chamber. A coolant passage 70 in the cylinder head lies adjacent to the air passage 58, air pockets 62 and the air injectors 64 to help maintain the air at an elevated constant temperature and prevent condensation of moisture in the air. Fuel injectors 72 are mounted to the upper ends of the air injectors 64 and operated to provide fuel for mixing with the pressurized air in the manner previously described.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

What is claimed is:

1. An engine including a combustion chamber for burning compressed air-fuel mixtures for providing power, said engine comprising:
    a component partially defining the combustion chamber and including an injector mounting opening connecting with the combustion chamber;
    a fuel injector for supplying fuel through the opening to the combustion chamber; and
    an air injector for the fuel injector and connected to receive fuel from the fuel injector for mixing with pressurized air supplied to the air injector, the air injector being mounted in the opening for directing a pressurized mixture of the air and fuel into the combustion chamber for mixing and combustion with engine intake air previously compressed in the combustion chamber;
    said component including an internal air passage intersecting the opening for communicating the air passage with the air injector, the air passage being connectable with a source of pressurized air for delivery to the air injector from the air source.

2. An engine as in claim 1 wherein the air passage extends longitudinally in the component and connects with a plurality of injector mounting openings each connecting with a combustion chamber defined in part by the component.

3. An engine as in claim 2 wherein the air passage extends linearly through the component and intersects a side portion of each of the openings for feeding pressurized air directly to each opening.

4. An engine as in claim 1 wherein the injector mounting opening includes inlet and outlet portions on opposite ends of a central portion which connects with the internal passage, the engine further including seals between the air injector and the opening and blocking the escape of pressurized air from the central portion through the inlet and outlet portions of the opening except through the air injector.

5. An engine as in claim 4 wherein the central portion of the opening defines an injector pocket from which the air injector receives the pressurized air delivered to the opening from the internal air passage.

6. An engine as in claim 1 wherein the air passage and the opening extend adjacent to a coolant passage in the component so that the temperature of the high pressure air delivered to the air injector is in part controlled by the temperature of coolant in the coolant passage.

7. An engine as in claim 1 wherein the combustion chamber defining component is a cylinder head.

8. An engine including a combustion chamber for burning compressed air-fuel mixtures for providing power, said engine comprising:
    a cylinder head partially defining the combustion chamber and including an injector mounting opening connecting with the combustion chamber;
    a fuel injector for supplying fuel through the opening to the combustion chamber; and
    an air injector for the fuel injector and connected to receive fuel from the fuel injector for mixing with pressurized air supplied to the air injector, the air injector being mounted in the opening for directing a pressurized mixture of the air and fuel into the combustion chamber for mixing and combustion with engine intake air previously compressed in the combustion chamber;
    said cylinder head including an internal air passage intersecting the opening for communicating the air passage with the air injector, the air passage being connectable with a source of pressurized air for delivery to the air injector from the air source.

9. An engine including a plurality of combustion chambers for burning compressed air-fuel mixtures for providing power, said engine comprising:
    a component partially defining the combustion chambers and including injector mounting openings connecting one with each of the combustion chambers;
    fuel injectors, each positioned for supplying fuel through one of the openings to an associated one of the combustion chambers; and
    an air injector for each fuel injector and connected to receive fuel from the associated fuel injector for mixing with pressurized air supplied to the respective air injector, each air injector being mounted in one of the openings for directing a pressurized mixture of the air and fuel into the associated combustion chamber for mixing and combustion with engine intake air previously compressed in the associated combustion chamber;
    said component including an internal air passage intersecting said openings for communicating the air passage with the air injectors, the air passage being connectable with a source of pressurized air for delivery to the air injectors from the air source.

10. An engine as in claim 9 wherein the air passage extends longitudinally in the component and connects with each of said injector mounting openings.

11. An engine as in claim 10 wherein the air passage extends linearly through the component and intersects a side portion of each of the openings for feeding pressurized air directly to each opening.

12. An engine as in claim 9 wherein the injector mounting openings each include inlet and outlet portions on opposite ends of a central portion which connects with the internal passage, the engine further including seals between the air injectors and their respective openings and blocking the escape of pressurized air from the central portions through the inlet and outlet portions of the openings except through the air injectors.

13. An engine as in claim 12 wherein the central portions of the openings define injector pockets from which the air injectors receive the pressurized air delivered to the openings from the internal air passage.

14. An engine as in claim 9 wherein the air passage and the openings extend adjacent to a coolant passage in the component so that the temperature of the high pressure air delivered to the air injectors is in part controlled by the temperature of coolant in the coolant passage.

15. An engine as in claim 9 wherein the combustion chamber defining component is a cylinder head.

* * * * *